United States Patent Office 3,635,864
Patented Jan. 18, 1972

3,635,864
COAL TAR AND MERCAPTAN-TERMINATED POLYMER COMPOSITIONS
William J. McCarthy and Robert W. Ireland, Avon Lake, Ohio, assignors to The B. F. Goodrich Company, New York, N.Y.
No Drawing. Filed Oct. 28, 1969, Ser. No. 871,944
Int. Cl. C07d 35/28, 43/28
U.S. Cl. 260—28.5 AS    8 Claims

ABSTRACT OF THE DISCLOSURE

Blends of mercaptan-terminated liquid copolymers and coal tar form curable sealant compositions that may be cured with suitable curing agents to form elastomers having adhesion to cementitious materials and are suitable for sealing concrete and forming elastomeric gaskets.

BACKGROUND OF THE INVENTION

Resilient sealants and gasketing materials are widely utilized for a variety of purposes related to concrete structures. Concrete road pavements, for example, provided resilient gasketing materials placed in expansion joints located at predetermined lengths in the roadway. Expansion joints create a collection point for water, dirt and other foreign matter and, therefore, such joints must be sealed in addition to having a resilient gasket. Accordingly, the resilient gasket must permanently adhere to the abutting substrates to prevent water and moisture from undermining the roadway. Other concrete structures such as sidewalks, cement floors, architectural slabs, roof and patio decking, and preformed concrete structures in like manner utilize traverse contraction joints to prevent random cracking due to expansion and contraction of concrete during seasonable temperature changes. In precast concrete building constructions, electomeric gasketing is utilized within abutting joints and expansion joints provided. Other concrete structures such as large concrete blocks are provided for supporting delicate scientific instruments or for supporting heavy manufacturing equipment. Very often these large concrete bases are extensively gasketed to insulate the supporting base from surrounding structures. Accordingly, numerous types of joints and grooves are gasketed and sealed for a variety of reasons.

Concrete surfaces tend to develop surface cracks and other surface defects. Resililent sealants are often utilized to seal the surface defects and thus prevent water and moisture from deteriorating the concrete. Concrete landing strips for jet airplanes are particularly vulnerable to the deteriorating effects of jet fuel. Resilient sealant compositions having specific resistance to hot air blasts of jet engines and resistance to organic jet fuel vapors are applied to concrete landing strips. Federal Specification No. SS–S–00200c, for example, sets forth Federal specifications and physical properties for sealants approved by the U.S. Government.

It now has been found that economical polymeric compositions based on mercaptan-terminated nitrile rubber copolymers in combination with coal tar and suitable curing agents may be advantageously cured to provide resilient elastomeric gasketing and sealants. The disclosed composition characteristically has extended pot life or working time, short tack-free time upon being applied to concrete, desirable penetration into the concrete surface, desirable aging properties upon being applied to concrete, negligible weight change upon being exposed to jet fuel and hot air, and desirable resistance of flow upon being cured. Desirable gasketing is readily formed by flowing liquid compositions into joints and grooves provided in concrete structures wherein the liquid composition readily cures to an elastomeric gasket having permanent adhesion to abutting substrates and being free of undesirable voids. These and other advantages will become more apparent from the detailed description of the invention.

SUMMARY OF THE INVENTION

In accordance with this invention, liquid curable sealant compositions of nitrile rubber copolymer and coal tar are provided. The liquid compositions may be compounded with suitable curing agents providing for predetermined curing characteristics enabling a broad latitude of sealant and gasketing applications to be achieved wherein the liquid composition suitably cures to a dimensionally stable elastomer having extended adhesion to adjacent substrates.

DETAILED DESCRIPTION OF THE INVENTION

Desirable polymeric compositions suitable for providing elastomeric gasketing and sealants within the scope of this invention comprise a curable composition of a mercaptan-terminated nitrile polymer blended with coal tars. Nitrile polymers are copolymers of major amounts of an aliphatic conjugated butadiene hydrocarbon with minor amounts of nitrile derivatives having at least one terminal $CH_2=C<$ group. Butadiene hydrocarbons include, for example, butadiene-1,3; isoprene; piperylene; 2,3 - dimethyl butadiene-1,3; pentadiene-1,3,2-neopentyl butadiene; 2-phenyl butadiene and other like butadienes. The preferred nitrile derivative monomer is acrylonitrile although nitrile derivatives such as methacrylonitrile and ethacrylonitrile are advantageously employed. Butadiene monomers and nitile monomers may be polymerized in the presence of minor amounts of other vinylidene monomers to form nitrile rubber copolymers. Hence, lesser amounts of other vinylidene comonomers having at least one terminal $CH_2=C<$ group and polymerizable with butadiene monomers or nitrile derivatives may be added and include, for example, styrene, substituted styrenes, alkyl esters of methacrylic and acrylic acid and like vinylidene monomers well known in the art.

Preferred nitrile rubbers within the scope of this invention are primarily copolymers of butadiene and acrylonitrile, with or without minor amounts of comonomers. Butadiene-acrylonitrile polymers preferably contain at least about 10 weight percent and up to about 35 weight percent bound acrylonitrile. More preferred butadiene-acrylonitrile rubbers contain from about 18 to 25 weight percent bound acrylonitrile. The nitrile polymers are mercaptan-terminated and methods of producing such rubbers are hereinafter described.

Mercaptan-terminated nitrile polymers may be produced by known processes such as hydrolysis or pyrolysis. With either process, mercaptan-terminated polymers are produced by polymerizing at least one monomer containing at least one $H_2C=<$ group in the presence of xanthogen disulfide and thereafter pyrolyzing or hydrolyzing the polymer to form —SH terminated polymers. Xanthogen disulfide is represented by the formula

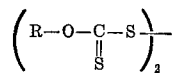

wherein R is an organic radical selected from the group consisting of an aliphatic, aryl, aralkyl, or an alicyclic radical. Preferably, the butadiene hydrocarbon, the nitrile derivative and other vinylidene monomers are reacted to form an xanthate-terminated polymer which is hydrolyzed or pyrolyzed to form a mercaptan-terminated polymer. A suitable pyrolysis process is detained in U.S. 3,499,301 and a suitable hydrolysis process is detailed in U.S. 3,047,544. Preferred mercaptan-terminated polymers have a mercaptan content (—SH) of about 1.7 to about 6.7 weight percent mercaptan and most preferred nitrile polymers contain from about 3.0 to 3.6 weight percent mercaptan. Hence, mercaptan-terminated nitrile polymers exhibit polyfunctionality with respect to mercaptan terminal groups and, therefore, may be converted or chemically cured to a non-fluid elastomeric material.

Mercaptan-terminated nitrile polymers hereinbefore described are advantageously combined with coal tars to provide thermosetting compositions suitable for forming elastomeric sealants and gaskets. Coal tars are defined generally by ASTM D490–47 (Reapproved 1968) and ordinarily are viscous black liquids produced as by-products from the destructive distillation of coal. Desirable coal tars, for example, include commercially available grades RT–2 (low viscosity) and RT–8 (high viscosity) as defined by ASTM D490–47. Coal tars are essentially compatible with mercaptan-terminated nitrile polymers and the amounts of coal tars added thereto may vary widely in accordance with properties desired in the elastomer. Depending on the viscosity of the blend of coal tar with nitrile polymer, up to about 700 weight parts of coal tar and preferably about 25 to 400 weight parts of coal tar are added to 100 weight parts of mercaptan-terminated nitrile polymer. Blends of coal tar and mercaptan-terminated polymers are effectively cured with suitable curing agents to be hereinafter described.

Suitable curing agents react with the mercaptan terminal groups of the polymer whereby the hydrogen of the mercaptan terminal group is removed or condensed to cross-link the mercaptan-terminated nitrile polymer. Preferred curing agents are acrylates comprising liquid acrylic and methacrylic esters of polyhydric alcohols wherein said arcrylates contain two or more reactive, terminally placed, vinyl groups. Preferred acrylate curing agents include polymethylene diacrylates of the formula:

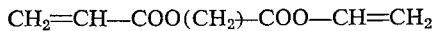

wherein $n$ is an integer from 2 to 8. Polymethylene diacrylates include, for example, ethylene diacrylate, hexamethylene diacrylate and octamethylene diacrylate. Preferred acrylate ester curing agents further include polyethylene glycol diacrylates of the formula:

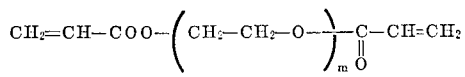

wherein $m$ is an integer from 1 to 4. Preferred acrylate curing agents include, for example, ethylene glycol diacrylate, diethylene glycol diacrylate, triethylene glycol diacrylate and tetraethylene glycol diacrylate all of which are well known and commercially available. Preferred acrylate curing agents further include trimethylol, propane triacrylate. Generally, a chemical equivalent of acrylate groups in the curing agent is added for each chemical equivalent of mercaptan groups in the nitrile polymer.

Referring now to preferred acrylate curing agents, such acrylic and methacrylic ester curing agents are desirably accelerated with primary, secondary and tertiary amines. Suitable amine accelerators include, for example, alkyl amines such as triethylene tetramine (TETA), diethylene triamine, tetramethyl pentamine, tetraethyl guanidine, dimethylaminopropylamine and dimethylaminoethanol. Suitable amine accelerators further include: cycloaliphatic amines, such as N,N-dimethyl cyclohexylamine; aryl-alkyl amines such as 2,4,6-tri-dimethylaminomethyl-phenol; heterocyclic amines such as N-aminoethyl piperazine. Amine accelerators are ordinarily added in amounts of about 0.1 to 5.0 weight parts per 100 weight parts of mercaptan-terminated nitrile polymer.

Other suitable curing agents well known in the art may be employed such as oxidizing agents which include, for example, lead and zinc peroxides, lead oxide, quinone, hydrogen peroxide and organic peroxides. Aromatic and aliphatic di- and tri-functional epoxides and isocyanates are further suitable curing agents which ordinarily are utilized in conjunction with an amine accelerator.

Further compounding ingredients well known in the art may be added to the blend of coal tar with percaptan-terminated nitrile polymers to provide suitable sealant and gasketing composition. Modifying ingredients are generally known as inorganic fillers, thioxotropes, and reinforcing agents. Inorganic fillers include, for example, clays, silicas, calcium carbonates, talc, mica, silicates, and like inorganic fillers. Thioxotropes include, for example, Cab-O-Sil, asbestos fibers, nylon flocs, rayon flocs, cotton flocs and like textile flocs. Reinforcing agents include, for example, carbon blacks, fine silicas and the like.

In practicing this invention, the sealant composition may be utilized as a one-component system with a variable working life which may be extended up to about 8 hours. However, a two-component system preferably is employed enabling each component mixture to be stored indefinitely until needed for use. Cure times can be shortened or extended depending upon the amounts of curing agents added wherein increased amounts or various types of curing agent or accelerator will accelerate the cure. Versamid 140, for example, is a polyamide accelerator which gives about an 8-hour working life, whereupon the polyamide accelerator effects a quick cure of the polymeric composition. As will be noted from the examples, increased amounts of coal tar tend to retard curing times thereby prolonging the working life available to such sealant compositions.

The foregoing description is for clearness and understanding, and modifications thereof will be obvious to those skilled in the art. The following examples and discussions will further illustrate the merits of this invention. All parts indicated are by weight unless otherwise noted.

EXAMPLE I

The following raw materials were mixed to form a polymeric composition suitable for forming a gasket.

Mercaptan-terminated butadiene acrylonitrile copolymer having about 24% bound acrylonitrile and about 3.3% mercaptan. (Viscosity about 35,000 cps. at 27° C.) _____ 100
Diglycidyl ether of bisphenol A _____ 100
Liquid polyamide (General Mills — Versamid #140) _____ 100
Coal tar RT–2 _____ 300

This composition was cured to form a gasketing material around a large concrete block for the purpose of insulating the surrounding building from shock waves. More specifically, the lower jaw portion of a large tension testing apparatus was securely anchored to a large concrete block (9 ft. x 4 ft. x 23 inches). The concrete block was a part of the floor of a surrounding building, however, the concrete block was peripherally separated from the rest of the floor by a space one inch wide. The concrete block rested on a cork pad. Liquid polymeric composition was poured into said one inch spacing, a deep and narrow crack, and cured at room temperature to an elastomeric gasket within about 8 hours and was tack free within about 16 hours. The cured gasket exhibited excellent resiliency effectively isolating the rest of the building from shock waves that occurred during tension testing of large metal samples. The gasket further exhibits excellent adhesion to both concrete substrates and effectively sealed the opening from water, dirt and other foreign materials. Laboratory test data on an elastomeric sample of the polymeric composition was as follows:

(1) Cured for 4 days at room temperature
   (a) Shore A Durometer hardness instantaneous/10 sec. _____ 37/35
   (b) Elongation at break, percent _____ 75
(2) Cured for 2 hours at 105° C.
   (a) Shore A Durometer hardness _____ 45/43
   (b) Elongation at break, percent _____ 75

EXAMPLE II

The following polymeric composition was used to fill seams and cracks in concrete roadways.

Part A

| | |
|---|---|
| Mercaptan-terminated nitrile rubber (Hycar MTBN) | 100 |
| Calcium carbonate (#10 Whiting) | 150 |
| Diethyleneglycol diacrylate | 9 |
| Trimethylolpropane triacrylate | 3 |
| Coal tar RT-8 | 84 |

Part B

| | |
|---|---|
| Coal tar RT-8 | 216 |
| Calcium carbonate (#10 Whiting) | 150 |
| Triethylene tetramine | 2 |

The polymeric composition had a work life of about 85 minutes and cured to a tack-free solid within 160 minutes. The elastomeric sealant effectively sealed the concrete against moisture and dirt exhibiting good extended adhesion to the concrete substrate through extreme changes in weather. The elastomeric sealant retained excellent resiliency in cold weather, and did not flow during hot weather.

EXAMPLE III

The composition of Example 2 was tested as a sealant-gasket between prestressed concrete slabs in a building construction. The concrete slabs were supported in a horizontal position which structure served as a combination roof and patio floor. The elastomeric sealant-gasket formed between abutting concrete slabs has continued to show excellent adhesion and resiliency after being in place for over two years wherein the elastomer material effectively sealed the seam against moisture and dirt.

EXAMPLE IV

The following polymeric composition was employed as a sealant for concrete runways.

| | |
|---|---|
| Hycar MTBN | 100 |
| Trimethylol propane triacrylate (TMPTA) | 12 |
| Coal tar RT-8 | 200 |
| Triethylene teramine (TETA) | 2 |

The polymeric composition was tested in accordance with Interim Federal Specification SS–S–00200c (Army MO) and the requirements for said specification were satisfied for tack free time, penetration, recovery, properties after aging at 158° F., weight change in fuel or hot air, and resistance to flow. In addition to excellent resistance to jet fuels and hot air, particular advantages were achieved in that the polymeric composition working life (pot life) could be easily varied over broad limits. The work life was 26 minutes and the tack-free time was about 60 minutes.

EXAMPLE V

| | |
|---|---|
| Hycar MTBN | 100 |
| Carbon black—Thermax N–990 | 25 |
| TMPTA | 12 |
| Coal tar RT-8 | 300 |
| TETA | 3 |

This polymer composition provided a suitable elastomeric sealant for concrete jet runways and satisfied Interim Federal Specification SS–S–00200c (Army MO) for tack-free time, penetration, recovery, properties after aging at 158° F., weight changes in fuel or hot air, and resistance to flow. In addition to excellent resistance to jet fuel and hot air, the polymeric composition was particularly advantageous in that working life (pot life) and cure time were controllable over broad limits which feature is important in sealing large surface areas. The work life was 35 minutes and the tack free time was about 145 minutes.

Although specific illustrations have been embodied herein, it is understood that the subject invention is not limited to the recited examples. All obvious variations and modifications thereof are contemplated and are included within the spirit and scope of this invention as defined in the appended claims.

We claim:

1. A curable polymeric composition suitable for forming elastomeric sealants and gaskets having adhesion to cementitious substrates comprising a mercaptan-terminated liquid nitrile polymer of butadiene and about 10 to 35% bound acrylonitrile containing from about 1.7% to about 6.7% by weight mercaptan, coal tar present in amounts of about 25 up to about 700 weight parts per 100 weight parts of said mercaptan-terminated nitrile polymer and a liquid acrylate curing agent containing 2 or more reactive terminal vinyl groups.

2. The polymeric composition defined in claim 1 wherein the liquid acrylate curing agent is present in amounts providing about a chemical equivalent of terminal vinyl groups of said acrylate curing agent per chemical equivalent of terminal mercaptan groups of said mercaptan-terminated nitrile polymer, and said acrylate curing agent is selected from the group consisting of trimethylol propane triacrylate, liquid acrylic esters of polyhydric alcohols and liquid methacrylic esters of polyhydric alcohols.

3. The polymeric composition defined in claim 2 wherein said mercaptan-terminated nitrile polymer contains from about 18% to about 25% by weight of bound acrylonitrile.

4. The polymeric composition defined in claim 2 wherein coal tars are present in amounts of about 25 to 400 weight parts of coal tar per 100 weight parts of mercaptan-terminated nitrile polymer.

5. The polymeric composition defined in claim 2 wherein said mercaptan-terminated nitrile polymer contains from about 3.0 to 3.6 weight percent mercaptan.

6. The polymeric composition defined in claim 1 wherein the acrylate curing agent is selected from the group consisting of polymethylene diacrylates of the formula

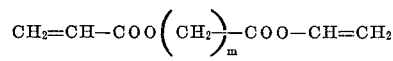

wherein $n$ is an integer from 2 to 8, and polyethylene glycol diacrylate of the formula

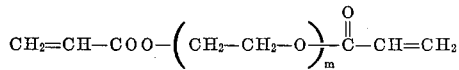

wherein $m$ is an integer from 1 to 4.

7. The polymeric composition defined in claim 1 wherein the acrylate curing agent is accelerated with at least about 0.1 weight parts amine accelerator per 100 weight parts of mercaptan-terminated nitrile polymer.

8. The polymeric composition defined in claim 2 wherein the acrylate curing agent is accelerated with at least about 0.1 weight parts amine accelerator per 100 weight parts of mercaptan-terminated nitrile polymer.

References Cited

UNITED STATES PATENTS

| | | | |
|---|---|---|---|
| 2,638,460 | 5/1953 | Crouch | 260—33.6 |
| 3,234,188 | 2/1966 | Warner | 260—29 |
| 3,353,978 | 11/1967 | Davie | 106—275 |
| 3,379,662 | 4/1968 | Bramble et al. | 260—17.4 |
| 3,449,301 | 6/1969 | Noll et al. | 260—79 |
| 3,487,052 | 12/1969 | Millen et al. | 260—79 |

MORRIS LIEBMAN, Primary Examiner

R. H. ZAITLEN, Assistant Examiner

U.S. Cl. X.R.

260—79, 79.5; 106—273, 279